(12) United States Patent
Fagot-Revurat et al.

(10) Patent No.: US 7,415,873 B2
(45) Date of Patent: Aug. 26, 2008

(54) VEHICLE TIRE AND THE USE OF A TEMPERATURE MEASURING SYSTEM

(75) Inventors: Lionel Fagot-Revurat, Ussel de Vensat (FR); Pascal Prost, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/792,018

(22) PCT Filed: Dec. 2, 2005

(86) PCT No.: PCT/EP2005/056413
§ 371 (c)(1),
(2), (4) Date: May 29, 2007

(87) PCT Pub. No.: WO2006/058918
PCT Pub. Date: Jun. 8, 2006

(65) Prior Publication Data
US 2007/0295072 A1    Dec. 27, 2007

(30) Foreign Application Priority Data
Dec. 2, 2004    (FR)    .................................. 04 12827

(51) Int. Cl.
G01M 17/02    (2006.01)
(52) U.S. Cl. .......................... 73/146; 137/223; 340/447
(58) Field of Classification Search ................... 73/146; 137/223; 340/447
See application file for complete search history.

(56) References Cited

U.S. PATENT DOCUMENTS

2002/0121132 A1    9/2002 Breed et al.

FOREIGN PATENT DOCUMENTS

EP    1 275 949 A    1/2003

*Primary Examiner*—Andre J Allen
(74) *Attorney, Agent, or Firm*—Cohen Pontani Lieberman & Pavane LLP

(57) ABSTRACT

A tire, the tread comprising rubber compounds and including a wear limit surface. At least one wireless temperature measurement system based on surface acoustic wave or bulk acoustic wave technology is embedded in a region of a rubber compound, said region being radially to the outside of a surface radially to the inside of the wear limit surface and the surface radially to the inside of the wear limit surface being, in the unworn state, at a distance from the outer surface of the tread of at most 95% of the thickness of the tread.

10 Claims, 3 Drawing Sheets

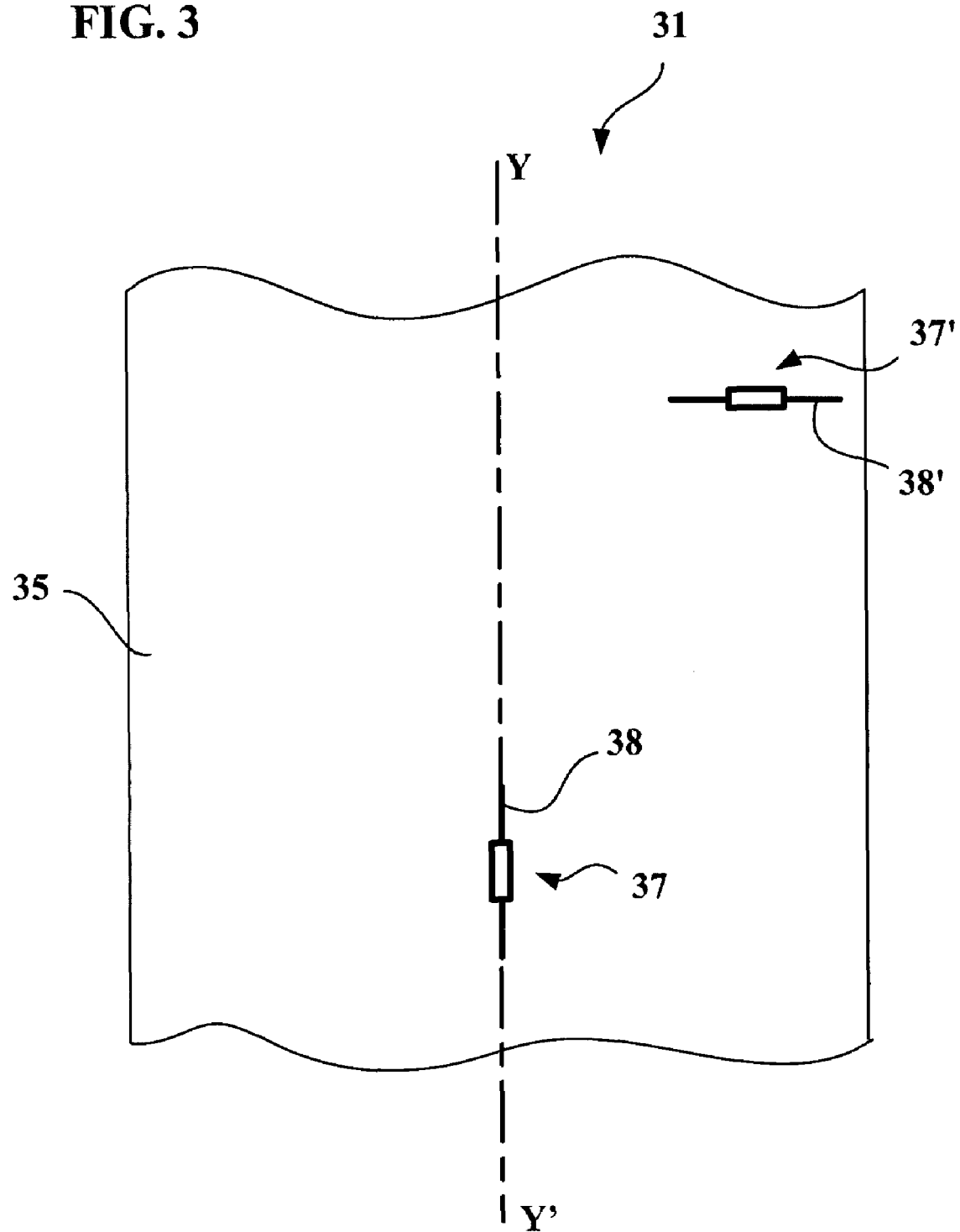

VEHICLE TIRE AND THE USE OF A TEMPERATURE MEASURING SYSTEM

RELATED APPLICATION

This is a U.S. National Phase Application under 35 USC 371 of International Application PCT/EP2005/056413, filed on Dec. 2, 2005.

FIELD OF THE INVENTION

The present invention relates to a vehicle tire consisting partly of rubber compounds. The invention also relates to the use of a wireless temperature measurement system in a vehicle tire.

The invention relates to tires for any type of vehicle, such as an automobile, a motorcycle, a heavy-goods vehicle, an agricultural machine or civil engineering machine.

Although not limited to such an application, the invention will be described more particularly with reference to a motorcycle tire.

BACKGROUND OF THE INVENTION

The reinforcement armature or reinforcement of tires, and especially of motorcycle tires is, at the present time—and usually—formed by a stack of one or more plies conventionally denoted by "carcass plies", "crown plies", etc. This way of denoting the reinforcements derives from the manufacturing process, which consists in producing a series of semifinished products in the form of plies, provided with filamentary reinforcing elements that are often longitudinal, which reinforcements are subsequently assembled or stacked so as to build up a tire blank. The plies are produced flat, with large dimensions, and are subsequently cut according to the dimensions of a given product. The plies are also assembled, firstly, substantially flat. The blank thus produced undergoes a forming operation so as to adopt the typical toroidal profile of tires. Semifinished products called "finishing products" are then applied to the blank, in order to obtain a product ready for vulcanization.

Such a "conventional" process involves, in particular as regards the phase of producing the tire blank, the use of an anchoring element (generally a bead wire), used for anchoring or retaining the carcass reinforcement in the region of the tire beads. Thus, for this type of process, a portion of all of the plies making up the carcass reinforcement (or only part of it) is upturned around a bead wire placed in the bead of the tire. In this way, the carcass reinforcement is anchored in the bead.

Generalization in the industry using this type of conventional process, despite many variants in the way in which the plies are produced and assembled, has led those skilled in the art to use a vocabulary derived from the process: hence the generally accepted terminology comprising in particular the terms "plies", "carcass", "bead wire", "forming", for denoting the passage from a flat profile to a toroidal profile, etc.

At the present time there are tires that do not comprise, strictly speaking, "plies" or "bead wires" according to the above definitions. For example, document EP 0 582 196 discloses tires produced without using semifinished products in the form of plies. For example, the reinforcing elements for the various reinforcement structures are applied directly to the adjacent layers of rubber compounds, the combination being applied by successive layers on a toroidal core, the shape of which makes it possible to obtain, directly, a profile matching the final profile of the tire being manufactured. Thus, in this case, there are no longer "semifinished products", nor "plies" nor a "bead wire". The base products, such as the rubber compounds and the reinforcing elements in the form of cords or filaments, are applied directly to the core. Since this core has a toroidal shape, there is no longer a forming operation for bringing the blank from a flat profile to a toroidal profile.

Moreover, the tires described in that document do not have a "conventional" upturn of the carcass ply around a bead wire. This type of anchoring is replaced with an arrangement in which circumferential cords are placed adjacent said sidewall reinforcement structure, the combination being embedded in an anchoring or bonding rubber compound.

There are also processes for assembly on a toroidal core using semifinished products suitable for rapid, effective and simple application on a central core. Finally, it is also possible to use a hybrid construction, comprising both certain semifinished products for achieving certain architectural aspects (such as plies, bead wires, etc.), whereas others are produced by directly applying reinforcing elements and/or compounds.

In the present document, so as to take into account recent technological developments both in the manufacturing field and in product design, the conventional terms such as "plies", "bead wires", etc. are advantageously replaced with neutral terms or terms that are independent of the type of process used. Thus, the term "carcass reinforcement" or "sidewall reinforcement" is valid for denoting the reinforcing elements of a carcass ply in the conventional process, and the corresponding reinforcing elements, generally applied in the sidewalls, of a tire produced using a process without semifinished products. For its part, the term "anchoring region" may denote both the "conventional" carcass ply upturn around a bead wire of a conventional process and the assembly formed by the circumferential reinforcing elements, the rubber compound and the adjacent sidewall reinforcement portions of a base region produced using a process with application on a toroidal core.

The longitudinal direction, or circumferential direction, of the tire is the direction corresponding to the periphery of the tire and is defined by the run direction of the tire.

A circumferential plane or circumferential sectional plane is a plane perpendicular to the rotation axis of the tire. The equatorial plane is the circumferential plane passing through the center or top of the tread.

The transverse or axial direction of the tire is parallel to the rotation axis of the tire.

A radial plane contains the rotation axis of the tire.

As in the case of all other tires, motorcycle tires may have a radial configuration, the architecture of such tires comprising a carcass reinforcement formed from one or two plies of reinforcing elements making an angle to the circumferential direction that may be between 65° and 90°, said carcass reinforcement being radially surmounted by a crown reinforcement formed from at least generally textile reinforcing elements. However, there are nonradial tires, to which the invention also applies. The invention therefore also relates to partially radial tires, that is to say those in which the reinforcing elements of the carcass reinforcement are radial at least over part of said carcass reinforcement, for example in the part corresponding to the crown of the tire.

Many crown reinforcement architectures have been proposed, whether the tire is intended to be mounted at the front or the rear of the motorcycle. A first structure consists, in respect of said crown reinforcement, in using only circumferential cords, and said structure is more particularly employed for the rear position. A second structure, inspired directly from the structures usually employed in tires for passenger cars, has been used to improve the wear resistance, and consists in the use of at least two working crown plies of reinforcing elements that are parallel to one another in each ply but crossed from one ply to the next, making acute angles with the circumferential direction, such tires being more particularly suitable for the front of motorcycles. Said two working crown plies may be associated with at least one ply of circumferential elements, these generally being obtained by the helical winding of a tape of at least one rubber-embedded reinforcing element.

The choice of tire crown architectures has an impact on certain tire properties, such as wear, endurance, grip or even running comfort or, in particular in the case of motorcycles, stability. However, other tire parameters such as the nature of the rubber compounds constituting the tread also have an impact on the properties of said tire. The choice and nature of the rubber compounds constituting the tread are for example essential parameters as regards wear properties. The choice and nature of the rubber compounds constituting the tread also have an impact on the grip properties of the tire.

Moreover, it is known to those skilled in the art that the physicochemical properties of rubber compounds vary with temperature, and therefore that the temperature has an influence on the properties of the tread of a tire.

Furthermore, it is known, for example from document EP 1 275 949, to implant a wireless sensor in tires so as to determine forces or stresses exerted within the tire.

Document EP 0 937 615 discloses the use of wireless surface acoustic wave sensors incorporated into a tire, especially for measuring the grip of a tire. Such a sensor has the advantage of being able to be remotely interrogated wirelessly, by radio waves, without a nearby energy source being necessary. The energy of the interrogating radio wave sent by a remote interrogation device is sufficient for the sensor to transmit a modified radio wave in response.

SUMMARY OF THE INVENTION

One object of the invention is to provide a tire for optimizing the operation of the vehicle and more precisely for optimizing the use of the vehicle by providing information relating to grip, to behavior or to wear of the tire.

This object has been achieved according to the invention by a tire comprising at least one carcass reinforcement structure formed from reinforcing elements and anchored on each side of the tire to a bead, the base of which is intended to be mounted on a rim seat, each bead being radially outwardly extended by a sidewall, the sidewalls radially outwardly joining a tread, the tread consisting partly of rubber compounds and including a wear limit surface, at least one wireless temperature measurement system based on surface acoustic wave or bulk acoustic wave technology being embedded in a region of a rubber compound of the tread, said region being radially to the outside of a surface radially to the inside of the wear limit surface and the surface radially to the inside of the wear limit surface being, in the unworn state, at a distance from the outer surface of the tread of at most 95%, preferably at most 90%, of the thickness of the tread.

Within the meaning of the invention, the wear limit surface of a tire is defined as being the surface extrapolated from wear indicators present on the tire.

The distance between the surface radially to the inside of the wear limit surface and the outer surface of the tread and the thickness of the tread are measured along the normal to the outer surface of the tread at the point under consideration.

It has been demonstrated during trials that the wireless temperature measurement systems based on SAW (surface acoustic wave) or BAW (bulk acoustic wave) technology permit a precise measurement of the local temperature to be obtained, that is to say a measurement of the temperature of the rubber compound, directly in the vicinity of said systems.

SAW or BAW sensors also have the advantage, as mentioned above, of being able to be remotely interrogated by radio waves, without a nearby energy source being necessary.

Another advantage of these sensors is due especially to their small dimensions which permit them to be placed in the abovementioned regions without disturbing the intrinsic operation of the tire.

The implantation or fitting of a wireless temperature measurement system based on surface acoustic wave or bulk acoustic wave technology in the region as defined according to the invention thus permits a local measurement of the temperature at a limited distance from the ground-contacting surface of the tire and may thus provide information about the properties of the tread of the tire and therefore the performance of the tire, such as grip or wear.

The measured temperature information is transmitted by acoustic waves to an interrogation device, for example one fastened to the vehicle, in order to provide the driver of the vehicle with indications. These indications available to the driver allow him to adapt the way he is driving the vehicle so as to limit the observed overheating and bring the tire back to acceptable temperatures for maintaining its performance.

According to a first embodiment of the invention, said region is radially to the outside of the wear limit surface. According to this first embodiment of the invention, the wireless temperature measurement system based on surface acoustic wave or bulk acoustic wave technology is fitted as close as possible to the surface of the tread. One risk in such an embodiment is that of being able to benefit from this system only over a part of the life of the tire, since the measurement system may be destroyed as the tire wears out.

According to a second preferred embodiment of the invention, said region is radially to the inside of the wear limit surface. According to this second embodiment of the invention, the measurement system is advantageously operational over the entire lifetime or use of the tire, whatever its stage of wear.

Advantageously, a variant of the invention provides for at least one measurement system to be embedded in a region lying in the equatorial plane of the tire, especially in the case of a motorcycle. For example, in the case of a motorcycle, it may in particular be useful to take a temperature measurement on the crown of the tire, that is to say, in the equatorial plane of the tire. The reason for this is that the tread region may, for example, be highly stressed during traveling at high speeds in a straight line for a long time.

According to another embodiment of the invention, at least one measurement system is embedded in a region of the axially outer ends of the tread. In particular in the case of a motorcycle, the curvature value of which is greater than 0.15, its use with cambered wheels results in a region of contact between the tread and the ground that corresponds to the axially outer parts of said tread. Fitting a measurement system in these regions may for example give indications to the rider as to limits not to be exceeded, especially as regards grip performance.

According to other embodiments of the invention, several wireless temperature measurement systems based on surface acoustic wave or bulk acoustic wave technology are embedded in tread regions as defined according to the invention, said systems being advantageously distributed along the axial direction of the tread. This distribution of the various measurement systems in the tread of a motorcycle tire makes it possible to obtain information about the temperature of the tread in various regions distributed over its axial width, for example as a function of use, either in a straight line or around curves, the tire then being cambered.

Advantageously according to the invention, when at least two wireless temperature measurement systems based on surface acoustic wave or bulk acoustic wave technology are embedded in various rubber compound regions of the tire, said measurement systems having linearly polarized antennas, the polarization directions of the antennas form between them an angle of between 30 and 90°.

The trials carried out have demonstrated that reception of the signal by the interrogation device, for example associated with the vehicle, needs to be oriented along an orientation corresponding to one or other of the antennas of the measurement system in order to receive their respective signals. Such a construction will thus allow signals from each of the measurement systems to be received, using either two interrogation devices or a single interrogation device designed to receive signals transmitted by the antennas, the polarization directions of which are different, thus making it possible to identify the origin of the transmitting antenna and therefore the associated measurement system. Such an embodiment therefore makes it possible to identify the source of the received signal and therefore allows the temperature of a defined region to be known in the case of two measurement systems placed in different regions. It is known to those skilled in the art that it is not possible to identify a sensor of the SAW or BAW resonator type on the basis of the signal that it transmits.

Indeed, in the case of SAW or BAW sensors of the resonator type, unlike SAW or BAW sensors of the delay line type, whenever at least two measurement devices of this type, using the same frequency band, are inserted into a tire, an associated interrogation device is not capable of identifying the source of the signals that it receives and therefore of identifying the sensor with which it communicates. The use of several SAW or BAW sensors of the resonator type does not allow transmission, by each of them, of signals permitting them to be identified when they work in the same frequency band.

To make it easier to install the temperature measurement system(s), the tire according to the invention is advantageously produced using a manufacturing technique of the type on a hard core or rigid former, as mentioned above.

Such a tire which, as mentioned above, is advantageously produced using a technique of the type on a hard or toroidal core, in particular permits the temperature measurement systems to be placed in a virtually final position, a shaping step not being required using this type of process, it being possible for said final position also to be completely identified. Indeed, the manufacture of the type on a hard core may allow a temperature measurement system with predetermined indexation.

The structure of a carcass reinforcement advantageously comprises reinforcing elements making an angle of between 65° and 90° with the circumferential direction.

The tire also includes, between the carcass reinforcement structure and the tread, a crown reinforcement architecture.

Standard crown reinforcement architectures for motorcycle tires vary depending on whether the tire is intended to be mounted on the front or the rear of the motorcycle. A first structure consists, in respect of said crown reinforcement, in employing only circumferential cords, and said structure is more particularly used for the rear position. A second structure, inspired directly from structures usually used in tires for passenger vehicles, has been used to improve the wear resistance, and consists in using at least two crown plies of reinforcing elements that are parallel to one another in each ply but crossed from one ply to the next, making acute angles with the circumferential direction, such tires being more particularly suitable for the front of motorcycles. Said two crown plies may be radially surmounted by at least one ply of circumferential elements.

According to a preferred embodiment of the invention, the crown reinforcement structure of the tire includes at least two plies of reinforcing elements such that, from one ply to the next, the reinforcing elements make between them angles of between 20 and 160° and preferably between 40 and 100°.

According to a preferred embodiment of the invention, the reinforcing elements of the working plies are made of textile material.

Also preferably, the reinforcing elements of a ply of circumferential reinforcing elements are metal and/or textile and/or glass reinforcing elements. The invention in particular provides for the use of reinforcing elements of different types in the same ply of circumferential reinforcing elements.

Also preferably, the reinforcing elements of the ply of circumferential reinforcing elements have an elastic modulus of greater than 6000 N/mm$^2$.

The invention also proposes the use of a wireless temperature measurement system based on surface acoustic wave or bulk acoustic wave technology, embedded in a region of a rubber compound of the tread radially to the outside of a surface radially to the inside of the wear limit surface, and the surface radially to the inside of the wear limit surface being, in the unworn state, at a distance from the outer surface of the tread of at most 95%, and preferably at most 90%, of the thickness of the tread.

BRIEF DESCRIPTION OF THE DRAWINGS

Further details and advantageous features of the invention will become apparent from the following description of exemplary embodiments of the invention with reference to FIGS. 1 to 3, which show:

FIG. 3, a sketch in plan view of the tread of a tire.

DETAILED DESCRIPTION OF THE DRAWINGS

Figure 1:
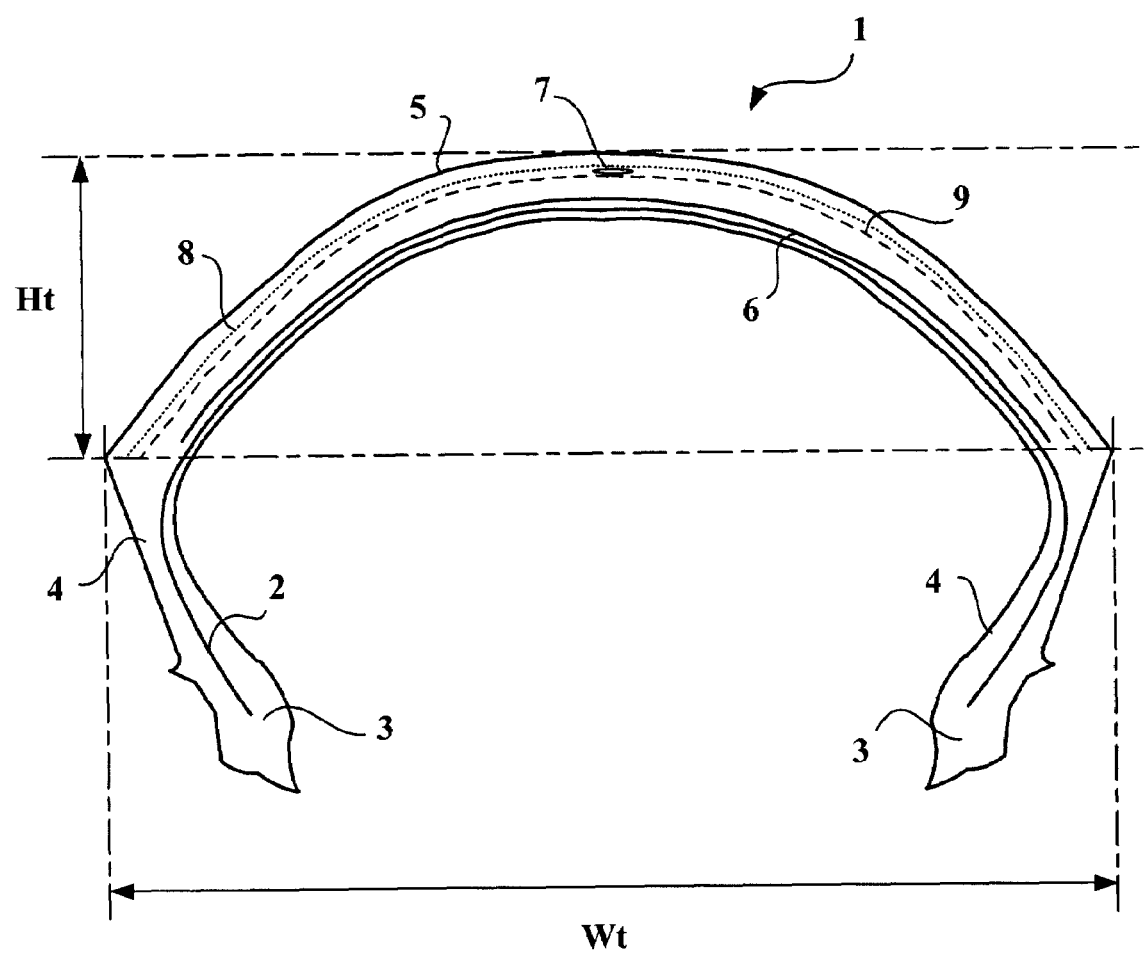
FIG. 1, a meridianal view of a diagram of a tire according to a first embodiment of the invention.
Figure 2:
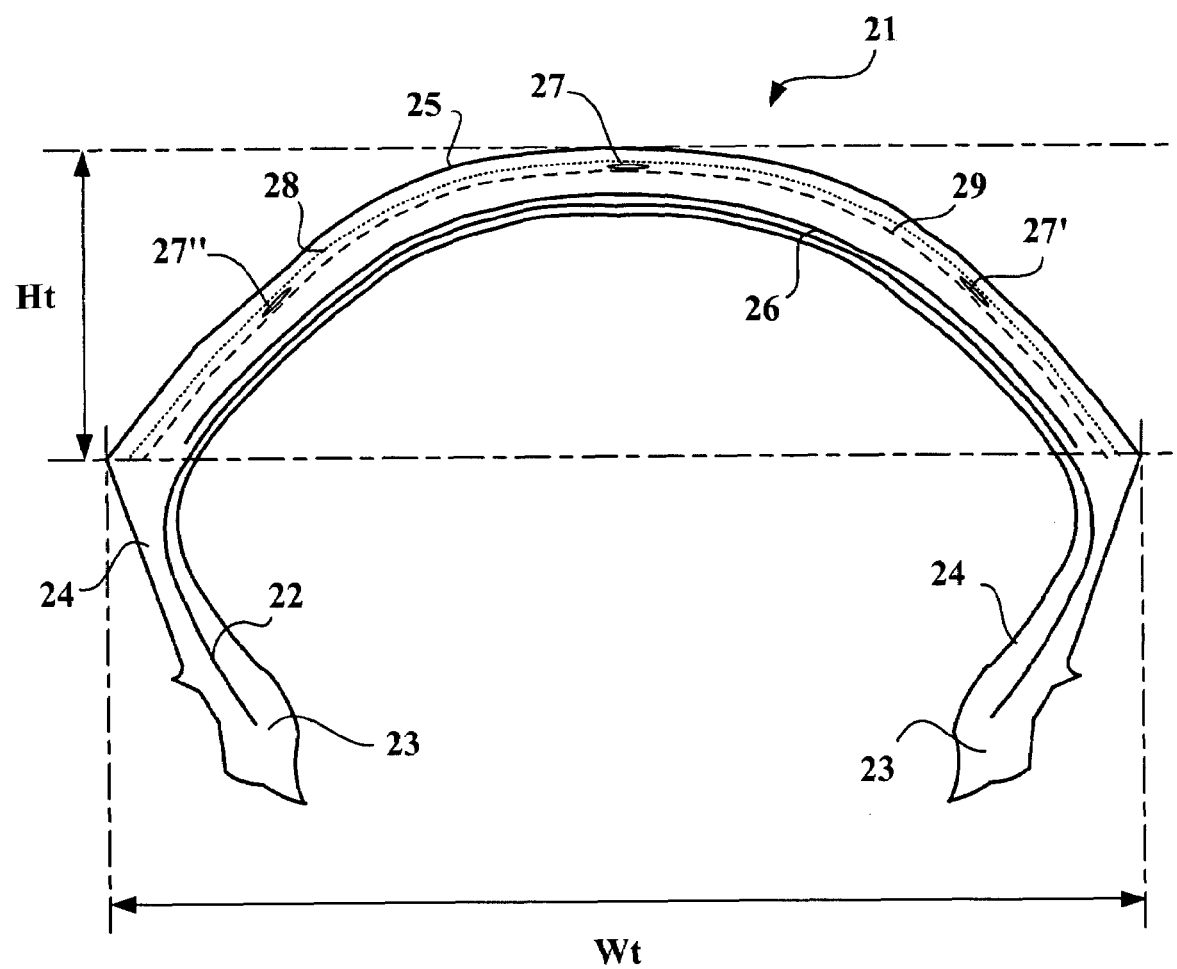
FIG. 2, a meridianal view of a diagram of a tire according to a second embodiment of the invention.

FIGS. 1 to 3 have not been drawn to scale so as to make them easier to understand.

FIG. 1 shows a tire 1 designed to be used on a vehicle of the motorcycle type, comprising a carcass reinforcement consisting of a single ply 2, comprising reinforcing elements of the textile type. The ply 2 consists of reinforcing elements positioned radially. The radial positioning of the reinforcing elements is defined by the lay angle of said reinforcing elements. A radial arrangement corresponds to a lay angle of said elements of between 65° and 90° to the longitudinal direction of the tire.

Said carcass ply 2 is anchored on each side of the tire 1 in a bead 3, the base of which is intended to be mounted on a rim seat. Each bead 3 is radially outwardly extended by a sidewall 4, said sidewall 4 radially outwardly joining a tread 5. The tire 1 thus formed has a curvature value of greater than 0.15 and preferably greater than 0.3. The curvature value is defined by the Ht/Wt ratio, that is to say the ratio of the height of the tread to the maximum width of the tread of the tire. The curvature value will advantageously be between 0.25 and 0.5 for a tire intended to be mounted at the front of a motorcycle and will advantageously be between 0.2 and 0.5 for a tire intended to be mounted at the rear.

The tire 1 also includes a crown reinforcement 6, the details of which have not been shown in the figure. The crown reinforcement may comprise at least one ply of reinforcing elements that are mutually parallel and make acute angles to the circumferential direction and/or a ply of circumferential reinforcing elements. In the case of the crown ply of a tire comprising at least two plies of reinforcing elements making acute angles to the circumferential direction, said reinforcing elements are crossed from one ply to the next, making angles of between 40 and 100° between them.

FIG. 1 also shows the wear limit surface 8 and a surface 9, radially to the inside of the wear limit surface 8 and, in the unworn state, at a distance from the outer surface of the tread of at most 95% of the thickness of the tread.

According to the invention, the tire includes a measurement system 7 for measuring the internal temperature of the rubber compound of the tread 5. This measurement system 7 is a wireless temperature sensor of the SAW (surface acoustic wave) type. This type of sensor has the advantage, as explained above, of not requiring an associated power supply. It measures the temperature of the rubber compound that surrounds it by modifying a wave that it receives and retransmits.

In the case of FIG. 1, the sensor 7 is placed in the equatorial plane of the tire 1 and provides information about the local temperature of the rubber compound, that is to say the temperature of the rubber compound directly in contact with the sensor. By placing the sensor in this region, the rider of the motorcycle can monitor, or be informed about, the temperature of this region, which is liable, especially when running at high speed in a straight line, to experience temperature rises that may modify the performance of the tread.

According to the invention, the sensor is radially to the outside of the surface 9 and radially to the inside of the wear limit surface 8. In this embodiment, according to the invention, the sensor is positioned near the outer surface of the tread and in a position that guarantees that the installation will last irrespective of the stage of wear of the tire.

Advantageously, an interrogation device is provided on the vehicle for receiving the signal transmitted by the sensor. Said operator device can thus analyze the signal and communicate the information to the rider or else possibly act directly on the vehicle.

FIG. 2 illustrates a second embodiment of the invention in which the tire 21 has at least three SAW resonator temperature measurement sensors 27, 27', 27" that are distributed over the axial width of the tread 25.

The first SAW resonator temperature measurement sensor 27 is installed, as in the case of FIG. 1, in the region of the equatorial plane of the tire 21 and therefore provides information regarding the internal temperature of that part of the tread 25 which is in contact with the ground when the motorcycle is traveling along the straight path.

The other SAW resonator temperature measurement sensors 27' and 27" are placed in the axially outer parts of the tread 25 of the tire 21, each sensor providing information about the internal temperature of an axially outer part of the tread 25 in contact with the ground when the motorcycle travels along a curved path, the tire 21 then being cambered.

In the case of FIG. 2, the SAW resonator temperature measurement sensors 27, 27', 27" lie in the same radial plane. In certain situations, it may be preferable to incorporate the sensors in different radial planes so as to avoid any risk of interference.

FIG. 3 is a sketch in plan view of the tread 35 of a motorcycle tire 31 in which at least two measurement sensors 37, 37' are embedded in rubber compounds of a tire.

A first temperature measurement sensor 37, of SAW resonator type, is placed in the region of the equatorial plane YY' of the tire 31 and, as explained in the case of FIGS. 1 and 2, provides information regarding the internal temperature of that part of the tread 35 in contact with the ground when the motorcycle follows a straight line.

A second temperature measurement sensor 37', of SAW resonator type, is placed in an axially outer part of the tread 35 of the tire 31 and provides information as regards the internal temperature of said axially outer part of the tread 35 which is in contact with the ground when the motorcycle follows a curved path, the tire 31 then being used with cambered wheels.

The temperature-relative information measured in the tread by each of the SAW resonator sensors is transmitted to an interrogation system, for example one attached to the vehicle. As was already mentioned above, the signals transmitted by the SAW or BAW resonator sensors do not allow the sensor to be selected. According to the representation shown in FIG. 3, the polarization directions of the antennas 38 and 38' of each of the sensors 37, 37' make between them an angle of approximately 90°. These different orientations of the antennas require that provision be made of complex transmit/receive systems within the device provided on the vehicle for communicating with each of the SAW resonator sensors implanted in the tire. Indeed the signals from each of the sensors can be received only by satisfactory electromagnetic coupling for each of these signals retransmitted by each sensor with a suitable interrogation device.

The invention claimed is:

1. A tire comprising at least one carcass reinforcement structure formed from reinforcing elements and anchored on each side of the tire to a bead, the base of which is intended to be mounted on a rim seat, each bead being radially outwardly extended by a sidewall, the sidewalls radially outwardly joining a tread, the tread comprising rubber compounds and including a wear limit surface, wherein at least one wireless temperature measurement system based on surface acoustic wave or bulk acoustic wave technology is embedded in a region of a rubber compound of the tread, and wherein said region is radially to the outside of a surface radially to the inside of the wear limit surface and wherein the surface radially to the inside of the wear limit surface is, in the unworn state, at a distance from the outer surface of the tread of at most 95% of the thickness of the tread.

2. The tire as claimed in claim 1, said region is radially to the outside of the wear limit surface.

3. The tire as claimed in claim 1, wherein said region is radially to the inside of the wear limit surface.

4. The tire as claimed in claim 1, wherein at least one measurement system is embedded in a region lying in the equatorial plane of the tire.

5. The tire as claimed in claim 1, wherein at least one measurement system is embedded in a region of the axially outer ends of the tread.

6. The tire as claimed in claim 1, including at least two wireless temperature measurement systems based on surface acoustic wave or bulk acoustic wave technology comprising linearly polarized antennas and being embedded in various rubber compound regions of the tire, wherein the polarization directions of the antennas form between them an angle between 30 and 90°.

7. The use of a tire as described in claim 1, for a two-wheeled motor vehicle such as a motorcycle.

8. The use of a wireless temperature measurement system based on surface acoustic wave or bulk acoustic wave technology, embedded in a region of a rubber compound of the tread radially to the outside of a surface radially to the inside of the wear limit surface, and the surface radially to the inside of the wear limit surface being, in the unworn state, at a distance from the outer surface of the tread of at most 95% of the thickness of the tread.

9. The use of a temperature measurement system as claimed in claim 8, wherein at least one measurement system is embedded in a region lying in the equatorial plane of the tire.

10. The use of a temperature measurement system as claimed in claim 8, wherein at least one measurement system is embedded in a region of the axially outer ends of the tread.

* * * * *